(12) United States Patent
Choi et al.

(10) Patent No.: US 7,648,631 B2
(45) Date of Patent: Jan. 19, 2010

(54) APPARATUS FOR WASTEWATER TREATMENT USING NITROGEN/PHOSPHORUS REMOVAL AND FLOATATION SEPARATION

(75) Inventors: Yong Su Choi, Seoul (KR); Sang Hyup Lee, Gyounggi (KR); Seok Won Hong, Seoul (KR); Tai Hak Chung, Seoul (KR); Yun Jung Kim, Seoul (KR); Young Gyun Choi, Daegu (KR)

(73) Assignee: Korea Institute of Science and Technology (KR)

( * ) Notice: Subject to any disclaimer, the term of this patent is extended or adjusted under 35 U.S.C. 154(b) by 228 days.

(21) Appl. No.: 11/468,897

(22) Filed: Aug. 31, 2006

(65) Prior Publication Data

US 2008/0006577 A1    Jan. 10, 2008

(30) Foreign Application Priority Data

Jul. 4, 2006    (KR) .................... 10-2006-0062542

(51) Int. Cl.
C02F 3/12    (2006.01)
(52) U.S. Cl. .................. 210/221.1; 210/221.2; 210/188
(58) Field of Classification Search .............. 210/221.1, 210/221.2, 748, 188
See application file for complete search history.

(56) References Cited

U.S. PATENT DOCUMENTS 4,280,886 A * 7/1981 Sawa et al. .................. 210/666
4,334,975 A * 6/1982 Ishizuka ..................... 204/247
4,802,962 A * 2/1989 Cairns ........................ 205/706
2003/0075502 A1 * 4/2003 Mullerheim ................ 210/615

FOREIGN PATENT DOCUMENTS

JP    2004066037 A *  3/2004

OTHER PUBLICATIONS

Grady et al. "Biological Wastewater Treatment", 2$^{nd}$ Edition, pp. 193-194, Marcel Dekker, Inc., 1999.

* cited by examiner

Primary Examiner—Chester T Barry
(74) Attorney, Agent, or Firm—Ohlandt, Greeley, Ruggiero & Perle, LLP

(57) ABSTRACT

A method and an apparatus for wastewater treatment using a nitrogen/phosphorus removal process combined with a floatation separation of sludge that is replaced by the gravity settling secondary clarifier are provided for effectively removing organic substances, nitrogen, phosphorus, granular substances and the like from wastewater. Al or Fe electrode plate is used for generating the micro bubbles so that phosphorus is removed by Al or Fe ions dissolved from the anode. With the method and the apparatus, a concentration of the microorganisms in the bioreactor is maintained high so that the volume and area of the reactor are reduced, that removal efficiency for organic substances, nitrogen, phosphorus is increased, that deterioration of settlability due to sludge bulking or micro floc and deterioration of out-flowing water quality are prevented, that the time required for settling is reduced to increase the processing quantity of wastewater, and that removal efficiency for phosphorus is maximized by simultaneous performances of biological phosphorus removal and chemical phosphorus removal by chemical agglomeration in the solid-liquid floatation separation vessel.

8 Claims, 1 Drawing Sheet

APPARATUS FOR WASTEWATER TREATMENT USING NITROGEN/PHOSPHORUS REMOVAL AND FLOATATION SEPARATION

BACKGROUND OF THE INVENTION

1. Field of the Invention

The present invention relates to a method and an apparatus for wastewater treatment using activated sludge, and more particularly to a method and an apparatus for an advanced treatment in which the floatation separation and concentration of sludge using the micro-bubbles generated upward is an alternative to the conventional secondary clarifier and can be combined with an existing nitrogen/phosphorous removal process to effectively remove organic substances, nitrogen, phosphorous, suspended solids and the like of the waste water. The present invention also relates to a method and an apparatus for wastewater treatment in which an electrode plate generating the micro-bubbles is made of Al or Fe so that phosphorous can be coagulated and removed by Al or Fe ions.

2. Description of the Prior Art

In a biological wastewater treatment process that removes organic substances, nitrogen, phosphorous, and the like from wastewater, the microorganisms called activated sludge are the biological solid matter that performs the most significant function. The operation efficiency of a wastewater treatment process using activated sludge (an activated sludge process) is much affected by high pollutants and hydraulic load including the concentration and the state of activated sludge in a reactor vessel, hydraulic retention time, solids retention time, and the like. In particular, the concentration of activated sludge is considered as a very important operation factor in an advanced wastewater treatment process including nitrogen/phosphorous removal as well as the conventional activated sludge process. However, the gravity settling that is the most universal solid-liquid separation method to separate sludge from the treated wastewater cannot regulate the concentration of the activated sludge in the reactor vessel in proper or maintain it in high concentration. In particular, it is indicated that a sludge bulking generated intermittently and a sludge re-floatation by nitrogen gas occurring via denitrification in a clarifier, and the resulting decrease in efficiency of solid-liquid separation and the excessive loss of the activated sludge are the problems that are the most difficult to solve with the gravity settling.

As methods that have been developed for operation of high concentration activated sludge process, there are an activated sludge process using a membrane bioreactor (MBR), a pure oxygen aerated process, a bio filter process using a carrier that is a representative bed attached growth process, and so on. However, in case of MBR process or bio filter process, incipient expenses for the purchase of membrane or carrier are large and, after a long-term operation, the blocking occurs due to the activated sludge or sludge secretion, causing the pressure loss to be increased. Accordingly, it has a problem in that a periodic washing or backwashing should be performed. In case of pure oxygen aerated process, since the excellent settling of sludge should be continuously secured in order to maintain the activated sludge in high concentration, it is known that stable operation thereof is impossible and it is also difficult for the concentration of the microorganisms in an aeration vessel to be maintained above 8,000 mg/L. Further, it also has a defect in that additional expenses are taken to supply pure oxygen.

Beside these methods, a sequencing batch reactor (SBR) process has been developed and adapted to the wastewater treatment wherein the unit steps of fill, reaction, settle, draw of wastewater, and idle are continuously performed in a single reactor vessel according to an array of predetermined time. This method is very advantageous with respect to stable management of wastewater or the like in that a secondary settling tank is not required because the respective unit steps are performed in a single reactor vessel, that it is easy to control filamentous fungi, and that it is easy to fabricate. However, the SBR process has a drawback in that it cannot maintain the concentration of mixed liquor suspended solids (MLSS) high to a desired level and a cycle time of overall process must be increased because a time taken for settling reaction that may be substantially essential is long. Moreover, the existing SBR process has a problem in that in case where a feature of water flow in the reactor vessel is changed in the process of discharging the processed water, the sludge particles are swept away by discharged water.

Meanwhile, in view of low C/N ratio and C/P ratio of domestic wastewater by nature, it is practically difficult to simultaneously remove nitrogen and phosphorous. Accordingly, it has been studied a method that nitrogen is removed biologically, and phosphorous is removed physically and chemically. However, most of phosphorous removal technologies studied or developed have had drawbacks of additional expenses due to addition of chemicals and instability of process efficiency due to intermittent injection of chemicals.

SUMMARY OF THE INVENTION

From the research for solving the above problems of the prior art, it has been found that the concentration of the microorganism can be maintained high so that the efficiency of removal of the organic substance, nitrogen and phosphorus can be maximized, by combining a solid-liquid floatation separation vessel using micro-bubbles with the existing N/P removal process.

Accordingly, an object of the present invention is to provide a method and an apparatus for wastewater treatment which maintain the activated sludge high in concentration and reduce the time for solid-liquid separation as well by the combination of the sludge floating separation and concentration using the micro-bubbles generated upward with the existing nitrogen/phosphorus removal process. Another object of the present invention is to provide a method and an apparatus for wastewater treatment which maximize the efficiency for phosphorus removal by using Al ions or Fe ions generated by the decomposition of an electrode plate in the process of generating micro-bubbles due to the coagulation effect of the dissolved phosphorus in water.

In order to accomplish the above object, there is provided a method for wastewater treatment using a nitrogen/phosphorus removal process combined with the floatation separation of sludge, the method comprising the step of a solid-liquid separation process in which a concentrated sludge layer is formed at an upper position and a processed-water layer is formed at a lower position due to the floatation of solid substances including a sludge by the micro-bubbles generated upward.

In the method for wastewater treatment, the micro-bubbles are generated by electrolysis of aluminum or iron electrode plate.

In the method for wastewater treatment, the processed water is discharged through outlet means for processed water at the lower portion of a solid-liquid separation vessel.

In the method for wastewater treatment, at least a portion of the concentrated sludge is discharged from the solid-liquid separation vessel and transferred to a bioreactor.

In the method for wastewater treatment, the bioreactor has a concentration of the microorganisms of 5000 mg/L or more.

In the method for wastewater treatment, the concentration of the microorganisms in the bioreactor is controlled by the transfer amounts of the concentrated sludge.

According to another aspect of the present invention, there is provided an apparatus for wastewater treatment using a nitrogen/phosphorus removal process combined with a sludge floatation separation, the apparatus comprising a solid-liquid floatation separation vessel (13) to generate the micro-bubbles to float and concentrate a sludge as well as to form a processed-water layer at a lower position, by substitution of the existing gravity settling-type secondary clarifier.

In the apparatus for wastewater treatment, the solid-liquid floatation separation vessel (13) includes a micro-bubble generator (31) having an electrode plate in which the micro-bubbles are generated by electrolysis.

In the apparatus for wastewater treatment, the micro-bubble generator (31) includes an Al or Fe electrode plate.

In the apparatus for wastewater treatment, the micro-bubble generator (31) is configured so that electrode plates are arranged in two or more rows.

In the apparatus for wastewater treatment, a unit of the micro-bubble generator (32) has one anode plate and two cathode plates.

In the apparatus for wastewater treatment, the solid-liquid floatation separation vessel (13) includes outlet means for the processed water for discharging the solid-liquid separated processed water.

In the apparatus for wastewater treatment, the outlet means for processed water includes an outlet line (21) or opening for processed water.

In the apparatus for wastewater treatment, the solid-liquid floatation separation vessel (13) includes sludge-discharge means for discharging the floated and concentrated sludge.

In the apparatus for wastewater treatment, the sludge-discharge means includes a discharge guide (16) formed by an inclined surface.

In the apparatus for wastewater treatment, the apparatus further comprises a sludge-carrying line (20) for carrying the sludge discharged from the solid-liquid floatation separation vessel (13) to a bioreactor.

In the apparatus for wastewater treatment, the sludge-carrying line (20) includes a degassing vessel (15) for degassing the bubbles contained in the sludge.

In the apparatus for wastewater treatment, the apparatus further comprises a storage vessel (14) for storing the processed water discharged from the solid-liquid floatation separation vessel (13).

In the apparatus for wastewater treatment, the apparatus further comprises a processed-water circulation line (22) for intermittently introducing the processed water from the storage vessel (14) to the solid-liquid floatation separation vessel (13) for carrying the floated and separated sludge to the degassing vessel (15).

In the apparatus for wastewater treatment, the processed-water circulation line (22) is positioned at the lower portion of the electrode plate of the solid-liquid floatation separation vessel (13) to intermittently backwash the electrode plate.

BRIEF DESCRIPTION OF THE DRAWINGS

The above and other objects, features and advantages of the present invention will be more apparent from the following detailed description taken in conjunction with the accompanying drawings, in which.

DESCRIPTION OF REFERENCE MARKS FOR THE MAIN PORTIONS OF THE DRAWINGS

Figure 1:
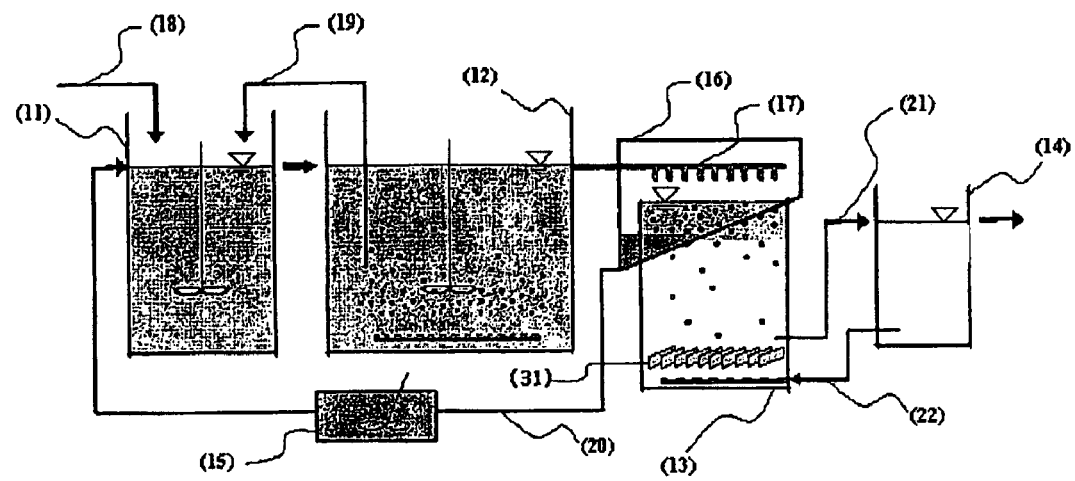
FIG. 1 is a schematic showing an example of a high efficiency MLE system for use in a nitrogen/phosphorus removal process combined with the floatation separation of a sludge according to the present invention.

11: non-oxygen vessel
12: aeration vessel
13: solid-liquid floatation separation vessel
14: storage vessel for processed water
15: degassing vessel
16: sludge-discharge guide
17: activated sludge dispersion inlet
18: inlet line for raw water
19: internal carrying line
20: sludge-carrying line
21: outlet line for processed water
22: processed-water circulation line
31: micro-bubble generator
32: unit of the micro-bubble generator

DETAILED DESCRIPTION OF THE PREFERRED EMBODIMENTS

Hereinafter, preferred embodiments of the present invention will be described with reference to the accompanying examples. The embodiments are described for illustrative purpose so the invention is not limited thereto.

Example

In the present example, a solid-liquid floatation separation vessel according to the present invention is combined with an MLE process that is the most representative nitrogen removal process using activated sludge. First of all, discharge water (hereinafter referred to as "raw water") from a primary clarifier and solid-liquid separation vessel (not shown) are supplied to a non-oxygen vessel (11) in MLE process via a inlet line (18) for raw water.

In the non-oxygen vessel (11), a denitrification occurs by the microorganisms using the organic substances contained in the raw water introduced as an electron donor and the organic substances are removed simultaneously. The hydraulic retention time in the non-oxygen vessel (11) is 2 to 4 hours, and a mixed solution of activated sludge microorganisms is agitated by an agitator. The raw water via the non-oxygen vessel (11) is introduced to an aeration vessel (12) in which ammonia nitrogen contained in the raw water is nitrificated into nitrificated nitrogen, and the organic substances that are not removed from the non-oxygen vessel (11) are oxidized into carbon dioxide. The solution nitrificated in the aeration vessel (12) is carried to the non-oxygen vessel (11) through an internal carrying line (19). The amounts of flow rate internally carried are 2-4 times the amounts of inflow rate of raw water, and the aeration vessel (12) is provided at its lower portion with an aerating portion for smooth supply of oxygen.

Figure 2:
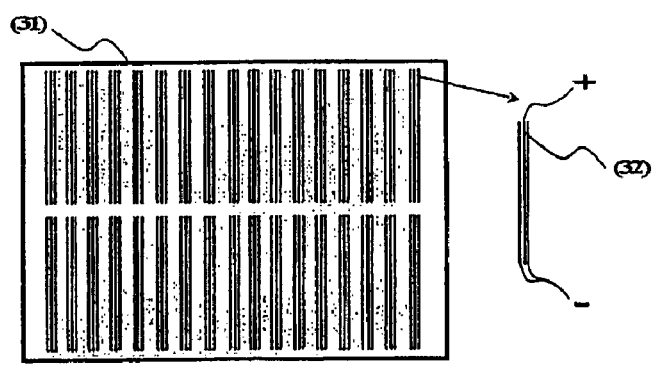
FIG. 2 is a schematic showing an example of an arrangement of an electrode plate in a micro-bubble generator unit of a solid-liquid floatation separation vessel for use in a nitrogen/phosphorus removal process combined with the floatation separation of sludge according to the present invention.

Then, the activated sludge mixed solution discharged from the aeration vessel (12) is introduced into the solid-liquid floatation separation vessel (13) to separate the processed water from activated sludge. In the activated sludge mixed solution introduced into the solid-liquid separation vessel (13) through an activated sludge dispersion inlet (17), the processed water underruns and is discharged through an outlet line (21) for processed water at the lower position. While the processed water underruns, Al or Fe ions dissolved from an anode of an electrode plate of a micro-bubble generator (31) positioned at the lower position agglomerate dissolved phosphorus in the processed water and the agglomerated phosphorus is floated and separated again, being removed from the processed-water. The anode is composed of aluminum or iron effective to agglomeration of phosphorus. The electrode plates are arranged in two rows as a planar arrangement of the micro-bubble generator (31) of FIG. 2. This arrangement is for maintaining current density constantly in the electrode plates. A unit of the micro-bubble generator (32) includes an anode and two cathodes as illustrated in FIG. 2. This is for using both surfaces of the anode plate.

The solid mixed solution including activated sludge in the solid-liquid floatation separation vessel (13) is solid-liquid separated and concentrated at the upper position due to the micro-bubbles generated upward by the micro-bubble generator (31). The micro-bubbles generated in a great amount by the micro-bubble generator (31) move upward to contact the solid including activated sludge so that the activated sludge floc is floated on the water surface because its specific gravity becomes small due to the micro-bubbles attached thereto.

High concentration activated sludge floated and separated flows out to the lower position along an inclined surface through a discharge guide (16), and the sludge flowing out to the lower position is carried to a non-oxygen vessel (11) along a sludge-carrying line (20). A degassing vessel (15) is provided to degas the micro-bubbles contained in the concentrated sludge, if required.

Since the concentration of the sludge floated and separated is very high above 20,000 mg/L, it is difficult to discharge the sludge. In the present invention, the processed water discharged from the solid-liquid floatation separation vessel (13) is stored in a storage vessel (14) for processed water and intermittently injected through a processed-water circulation line (22) for smooth discharge of the floated and concentrated sludge. When the sludge is discharged using such method, activated sludge floated and separated can be surely discharged and the electrode plate of the micro-bubble generator (31) positioned at the lower portion of the solid-liquid floatation separation vessel (13) for sludge is backwashed at the same time.

Table 1 shows a concentration of a mixed liquor suspended solids (MLSS) in activated sludge reactor, a proper organic loading rate, an organic removal efficiency, SS removal efficiency, a nitrogen removal efficiency, and a phosphorus removal efficiency with respect to a high efficiency MLE process combined with the floatation separation of sludge according to the present invention, an MBR process representative of high concentration activated sludge process, a pure oxygen activated sludge process, and a high rate aeration process.

TABLE 1

|  | MBR | Pure Oxygen Activated Sludge Process | High Rate Aeration Process | Present Invention |
|---|---|---|---|---|
| Reactor MLSS(g/L) | 7~15 | 3~8 | 4~10 | 5~12 |
| BOD Volume Loading | 0.2~1.2 | 1.6~3.2 | 1.6~16 | 0.2~12 |

TABLE 1-continued

|  | MBR | Pure Oxygen Activated Sludge Process | High Rate Aeration Process | Present Invention |
|---|---|---|---|---|
| Rate(kgBOD/m³·day) | | | | |
| Organic Removal efficiency (%) | >95% | 85~95 | 75~90 | >95% |
| SS Removal efficiency (%) | >95% | 85~95 | 75~90 | >95% |
| Nitrogen Removal efficiency (%) | <70% | <50% | <50% | 70~90% |
| Phosphorus Removal efficiency (%) | <50% | <50% | <50% | >80% |

According to the method of the present invention, when the sludge is once floated and separated from the solid-liquid floatation separation vessel, the sludge is not settled again by the micro-bubbles contained in the sludge layer floated and separated as well as the sludge layer is not separated due to flowing characteristic in the reactor occurring in the process of discharging the processed water, so that there is poor possibility that the sludge particles floated and separated are washed away by flowing-out water. Further, the present invention prevents the sludge bulking and the sludge loss due to increase of floc. That is, since the method of the present invention can solid-liquid separate high concentration of biological solid substances stably, the MLSS concentration of the bioreactor can be maintained to a desired level. In case where the concentration of the microorganisms is maintained high, as indicated in Table 1, an operation is possible for high organic loading rate so that the hydraulic retention time of the bioreactor can be greatly reduced. When the hydraulic retention time of the bioreactor is reduced, processing capacity is improved within a predetermined time so that it can be obtained an improvement effect in overall processing efficiency. Also, since a settling process adapted in the existing nitrogen/phosphorus removal process is replaced by the sludge floatation and concentration, the time required for solid-liquid separation is reduced to ⅓ or less relative to the settling process, thereby obtaining a reduction effect in an area for the solid-liquid separation vessel.

According to the present method, since the quantity of inflowing organic substances is smaller than that of heterotroph microorganism maintained in high concentration, F/M ratio is reduced to increase a self-oxidation rate of the microorganism. Most of the self-oxidized microorganisms are slowly biodegradable COD (SBCOD) (See Grady & Daigger, Biological wastewater treatment, $2^{nd}$ Ed., pp. 193-194, Marcel Dekker, Inc., 1999), which is transformed into readily biodegradable COD (RBCOD) by hydrolysis and absorbed by other heterotroph microorganisms, thereby reducing the generated amounts of excess sludge. Moreover, in the present method for wastewater treatment, a great amount of bubbles are contained in the excess sludge discharged through the sludge-carrying line for maintaining proper solid concentration and solids retention time (SRT) of the bioreactor, so that the dehydration feature is excellent to reduce expenses of final disposal of sludge. The present method is a cheap and economic process with low initial installation cost and easy maintenance relative to the existing high concentration activated sludge process.

As set forth before, a nitrogen/phosphorus removal process combined with the floatation separation of sludge of the present invention is a wastewater treatment process for effectively removing organic substances, nitrogen, phosphorus, granular substances and the like from wastewater, whereby upon a stable operation of the removal process for nitrogen and phosphorus including high concentration microorganisms according to the present invention, the volume of the reactor can be reduced or the loading rate of the inflowing amounts and contaminated substances can be increased. Furthermore, the time required for solid-liquid separation is reduced to $1/3$ or less in the existing nitrogen/phosphorus removal process relative to the conventional settling process, thereby obtaining a reduction effect in an area for the solid-liquid separation vessel. Moreover, the generated amounts of excess sludge are reduced and the generated sludge contains a great quantity of bubbles so that a high dehydration feature is obtained to thus reduce disposal expenses.

Although preferred embodiments of the present invention have been described for illustrative purposes, those skilled in the art will appreciate that various modifications, additions and substitutions are possible, without departing from the scope and spirit of the invention as disclosed in the accompanying claims.

What is claimed is:

1. An apparatus for wastewater treatment using a nitrogen/phosphorus removal process combined with a sludge floatation separation, the apparatus comprising a solid-liquid floatation separation vessel floating and concentrating sludge as well as forming a processed-water layer at a lower position by generating micro-bubbles, wherein the solid-liquid floatation separation vessel comprises a micro-bubble generator comprising electrode plates in which micro-bubbles are generated by electrolysis, and sludge-discharge means for discharging the floated and concentrated sludge.

2. The apparatus as claimed in claim 1, wherein the micro-bubble generator comprises an Al or Fe electrode plate.

3. The apparatus as claimed in claim 1, wherein the micro-bubble generator is configured so that electrode plates are arranged in two or more rows.

4. The apparatus as claimed in claim 1, further comprising a sludge-carrying line for carrying the sludge discharged from the solid-liquid floatation separation vessel to a bioreactor.

5. The apparatus as claimed in claim 4, wherein the sludge carrying line comprises a degassing vessel for degassing bubbles contained in the sludge.

6. The apparatus as claimed in claim 1, further comprising a storage vessel for storing the processed water discharged from the solid-liquid floatation separation vessel.

7. The apparatus as claimed in claim 6, further comprising a processed-water circulation line for intermittently introducing the processed water from the storage vessel to the solid-liquid floatation separation vessel.

8. The apparatus as claimed in claim 7, wherein the processed water circulation line is positioned at the lower portion of the electrode plate of the solid-liquid floatation separation vessel to intermittently backwash the electrode plate.

* * * * *